(12) United States Patent
Wei et al.

(10) Patent No.: US 9,867,131 B2
(45) Date of Patent: Jan. 9, 2018

(54) WAKE-UP CONTROL METHOD AND APPARATUS, AND TERMINAL DEVICE

(71) Applicant: HUAWEI DEVICE (DONGGUAN) CO., LTD., Dongguan (CN)

(72) Inventors: Konggang Wei, Shenzhen (CN); Yu Peng, Shanghai (CN); Xiaolong Zhu, Shanghai (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 111 days.

(21) Appl. No.: 14/921,551

(22) Filed: Oct. 23, 2015

(65) Prior Publication Data

US 2016/0044598 A1 Feb. 11, 2016

Related U.S. Application Data

(63) Continuation of application No. PCT/CN2014/080050, filed on Jun. 17, 2014.

(30) Foreign Application Priority Data

Jun. 17, 2013 (CN) .......................... 2013 1 0239380

(51) Int. Cl.
*H04W 52/02* (2009.01)
*H04W 76/04* (2009.01)

(52) U.S. Cl.
CPC ....... *H04W 52/0251* (2013.01); *H04W 76/04* (2013.01); *Y02B 60/50* (2013.01)

(58) Field of Classification Search
CPC ... H04W 52/0251; H04W 76/04; Y02B 60/50
See application file for complete search history.

(56) References Cited

U.S. PATENT DOCUMENTS 7,289,832 B1 10/2007 Enoki et al.
2004/0165574 A1* 8/2004 Kakumaru ........ H04W 52/0216
370/349

(Continued)

FOREIGN PATENT DOCUMENTS

CN 101458538 A 6/2009
CN 101466092 A 6/2009

(Continued)

OTHER PUBLICATIONS

Partial English Translation and Abstract of Japanese Patent Application No. JPA2001102990, dated Dec. 7, 2016, 14 pages.

(Continued)

*Primary Examiner* — Ajay Cattungal
(74) *Attorney, Agent, or Firm* — Conley Rose, P.C.

(57) ABSTRACT

A wake-up control method and apparatus, and a terminal device are provided. The method includes determining, by a wake-up control apparatus, whether a network of a terminal device is in a connected state; and if the wake-up control apparatus determines that the network of the terminal device is not in the connected state, stopping, by the wake-up control apparatus, wake-up of the terminal device by N application wake-up timers, where N is an integer greater than or equal to 1. The wake-up control apparatus shields some application wake-up timers, such that the shielded application wake-up timers do not wake up the terminal device.

16 Claims, 5 Drawing Sheets

A wake-up control apparatus determines whether a network of a terminal device is in a connected state — S101

If the wake-up control apparatus determines that the network of the terminal device is not in the connected state, the wake-up control apparatus stops wake-up of the terminal device by N application wake-up timers, where N is an integer greater than or equal to 1 — S102

(56) References Cited

U.S. PATENT DOCUMENTS

| | | | |
|---|---|---|---|
| 2004/0246031 A1* | 12/2004 | Lourens | G01K 3/005 327/58 |
| 2006/0212728 A1* | 9/2006 | Di Benedetto | G06F 9/441 713/300 |
| 2007/0202932 A1 | 8/2007 | Keller | |
| 2008/0120423 A1 | 5/2008 | Hall et al. | |
| 2008/0147213 A1* | 6/2008 | Omiya | G06F 3/162 700/94 |
| 2009/0180412 A1* | 7/2009 | Albert | H04W 52/0229 370/311 |
| 2010/0100716 A1* | 4/2010 | Scott | G06F 1/3209 713/1 |
| 2010/0127919 A1* | 5/2010 | Curran | H04W 4/021 340/573.4 |
| 2010/0291899 A1* | 11/2010 | Machani | H04W 12/12 455/411 |
| 2012/0154147 A1* | 6/2012 | Cao | G08B 21/0202 340/539.13 |
| 2012/0167118 A1 | 6/2012 | Pingili et al. | |
| 2012/0185717 A1 | 7/2012 | Song et al. | |
| 2013/0151102 A1 | 6/2013 | Kim et al. | |

FOREIGN PATENT DOCUMENTS

| | | |
|---|---|---|
| CN | 101631377 A | 1/2010 |
| CN | 102065526 A | 5/2011 |
| CN | 102197349 A | 9/2011 |
| CN | 102594158 A | 7/2012 |
| CN | 103144574 A | 6/2013 |
| EP | 2400369 A1 | 12/2011 |
| JP | 2001102990 A | 4/2001 |
| JP | 2006115166 A | 4/2006 |
| KR | 20100101652 A | 9/2010 |
| KR | 20110030274 A | 3/2011 |
| WO | 2011034351 A2 | 3/2011 |

OTHER PUBLICATIONS

Partial English Translation and Abstract of Japanese Patent Application No. JPA2006-115166, dated Dec. 7, 2016, 79 pages.

Foreign Communication From a Counterpart Application, Japanese Application No. 2016-512220, Japanese Office Action dated Oct. 11, 2016, 5 pages.

Foreign Communication From a Counterpart Application, Japanese Application No. 2016-512220, English Translation of Japanese Office Action dated Oct. 11, 2016, 6 pages.

Foreign Communication From a Counterpart Application, Korean Application No. 10-2015-7030601, Korean Notice of Allowance dated Oct. 21, 2016, 2 pages.

Foreign Communication From a Counterpart Application, Korean Application No. 10-2015-7030601, English Translation of Korean Notice of Allowance dated Oct. 21, 2016, 1 pages.

Foreign Communication From a Counterpart Application, Korean Application No. 10-2015-7030601, Korean Office Action dated Apr. 25, 2016, 4 pages.

Foreign Communication From a Counterpart Application, Korean Application No. 10-2015-7030601, Korean Office Action dated May 4, 2016, 7 pages.

Foreign Communication From a Counterpart Application, European Application No. 14814024.7, Extended European Search Report dated Mar. 7, 2016, 6 pages.

Partial English Translation and Abstract of Chinese Patent Application No. CN101458538, dated Jan. 13, 2016, 6 pages.

Partial English Translation and Abstract of Chinese Patent Application No. CN101466092, Part 1, dated Oct. 10, 2015, 4 pages.

Partial English Translation and Abstract of Chinese Patent Application No. CN101466092, Part 2, dated Oct. 10, 2015, 2 pages.

Foreign Communication From a Counterpart Application, PCT Application No. PCT/CN2014/080050, English Translation of International Search Report dated Sep. 19, 2014, 2 pages.

Foreign Communication From a Counterpart Application, PCT Application No. PCT/CN2014/080050, English Translation of Written Opinion dated Sep. 19, 2014, 8 pages.

Machine Translation and Abstract of Chinese Publication No. CN101631377, dated Jan. 20, 2010, 11 pages.

Foreign Communication From a Counterpart Application, Chinese Application No. 201310239380.X, Chinese Office Action dated Mar. 27, 2017, 6 pages.

* cited by examiner

WAKE-UP CONTROL METHOD AND APPARATUS, AND TERMINAL DEVICE

CROSS-REFERENCE TO RELATED APPLICATIONS

This application is a continuation of International Application No. PCT/CN2014/080050, filed on Jun. 17, 2014, which claims priority to Chinese Patent Application No. 201310239380.X, filed on Jun. 17, 2013, both of which are hereby incorporated by reference in their entireties.

TECHNICAL FIELD

Embodiments of the present disclosure relate to the field of communications technologies, and in particular, to a wake-up control method and apparatus, and a terminal device.

BACKGROUND

With popularization of intelligent terminals, for example, a smartphone and a tablet computer, an increasing quantity of applications are developed for the intelligent terminals. A user may download and install various applications on a mobile phone at will. However, a timer is set in many applications, for example, an application of an instant messaging type and an application of a news type. When an intelligent terminal is in a standby state, a timer is used to regularly wake up the intelligent terminal. The intelligent terminal is then connected to a corresponding server of each application by use of a network, and then the corresponding server of each application sends a synchronization message, a push message or the like back to the intelligent terminal, so as to enable each application to synchronize with the corresponding server or acquire latest information.

However, when an intelligent terminal is in a state of no network connection, an application still wakes up the intelligent terminal using a timer.

SUMMARY

Embodiments of the present disclosure provide a wake-up control method and apparatus, and a terminal device, so as to reduce electricity consumption of a terminal device.

According to a first aspect, an embodiment of the present disclosure provides a wake-up control method, including determining, by a wake-up control apparatus, whether a network of a terminal device is in a connected state; and if the wake-up control apparatus determines that the network of the terminal device is not in the connected state, stopping, by the wake-up control apparatus, wake-up of the terminal device by N application wake-up timers, where N is an integer greater than or equal to 1.

In a first possible implementation manner of the first aspect, after the stopping, by the wake-up control apparatus, of wake-up of the terminal device by N application wake-up timers, the method further includes determining, by the wake-up control apparatus, again whether the network of the terminal device is in the connected state; and if the wake-up control apparatus determines that the network of the terminal device is in the connected state, resuming, by the wake-up control apparatus, wake-up of the terminal device by the N application wake-up timers.

With reference to the first possible implementation manner of the first aspect, in a second possible implementation manner of the first aspect, before the resuming, by the wake-up control apparatus, of wake-up of the terminal device by the N application wake-up timers, the method further includes transferring, by the wake-up control apparatus, N pieces of application wake-up timer information from a suspension list to a wake-up list; and resuming, by the wake-up control apparatus, wake-up of the terminal device by the N application wake-up timers includes resuming, by the wake-up control apparatus, wake-up of the terminal device by the application wake-up timers corresponding to the N pieces of application wake-up timer information in the wake-up list.

With reference to the first aspect or the first possible implementation manner of the first aspect or the second possible implementation manner of the first aspect, in a third possible implementation manner of the first aspect, before the stopping, by the wake-up control apparatus, of wake-up of the terminal device by N application wake-up timers, the method further includes transferring, by the wake-up control apparatus, the N pieces of application wake-up timer information from the wake-up list to the suspension list, where the wake-up list includes M wake-up lists, and M is an integer greater than or equal to N; and stopping, by the wake-up control apparatus, wake-up of the terminal device by N application wake-up timers includes stopping, by the wake-up control apparatus, wake-up of the terminal device by the application wake-up timers corresponding to the N pieces of application wake-up timer information in the suspension list.

With reference to the third possible implementation manner of the first aspect, in a fourth possible implementation manner of the first aspect, transferring, by the wake-up control apparatus, the N pieces of application wake-up timer information from the wake-up list to the suspension list includes transferring, by the wake-up control apparatus according to application identifier information in a preset blacklist, application wake-up timer information that is in the wake-up list and includes the application identifier information in the preset blacklist to the suspension list, where the application wake-up timer information includes identifier information of an application to which an application wake-up timer belongs; and/or determining, by the wake-up control apparatus, whether a type of an application wake-up timer in application wake-up timer information in the wake-up list is a type of being capable of waking up a terminal device, where the application wake-up timer information includes that the type of an application wake-up timer is the type of being capable of waking up a terminal device or a type of being incapable of waking up a terminal device; and if the wake-up control apparatus determines that the type of an application wake-up timer in the wake-up list is the type of being capable of waking up a terminal device, transferring, by the wake-up control apparatus, the wake-up timer information that is in the wake-up list and includes the type of being capable of waking up a terminal device to the suspension list.

With reference to the fourth possible implementation manner of the first aspect, in a fifth possible implementation manner of the first aspect, if the wake-up control apparatus determines that the type of an application wake-up timer in the wake-up list is the type of being capable of waking up a terminal device, the method further includes determining, by the wake-up control apparatus, whether the type of being capable of waking up a terminal device is a type of being useless to wake up a terminal device; and if the wake-up control apparatus determines that the type of being capable of waking up a terminal device is the type of being useless to wake up a terminal device, transferring, by the wake-up control apparatus, application wake-up timer information that is in the wake-up list and includes the type of being useless to wake up a terminal device to the suspension list.

With reference to the fourth possible implementation manner of the first aspect or the fifth possible implementation manner of the first aspect, in a sixth possible implementation manner of the first aspect, if the wake-up control apparatus determines that the type of an application wake-up timer in the wake-up list is the type of being capable of waking up a terminal device, the method further includes determining, by the wake-up control apparatus, whether the type of being capable of waking up a terminal device is a type of repeatedly waking up a terminal device; and if the wake-up control apparatus determines that the type of being capable of waking up a terminal device is the type of repeatedly waking up a terminal device, transferring, by the wake-up control apparatus, application wake-up timer information that is in the wake-up list and includes the type of repeatedly waking up a terminal device to the suspension list.

With reference to the sixth possible implementation manner of the first aspect, in a seventh possible implementation manner of the first aspect, the determining, by the wake-up control apparatus, whether the type of being capable of waking up a terminal device is a type of repeatedly waking up a terminal device includes determining, by the wake-up control apparatus, whether the wake-up timer information includes a wake-up period, and if the wake-up control apparatus determines that the application wake-up timer information includes the wake-up period, determining, by the wake-up control apparatus, that the type of being capable of waking up a terminal device is the type of repeatedly waking up a terminal device.

With reference to the sixth possible implementation manner of the first aspect, in an eighth possible implementation manner of the first aspect, before the determining, by the wake-up control apparatus, whether the type of being capable of waking up a terminal device is a type of repeatedly waking up a terminal device, the method further includes acquiring, by the wake-up control apparatus within a preset time, wake-up intervals at which an application wake-up timer of the type of being capable of waking up a terminal device wakes up the terminal device K times, where K is an integer greater than or equal to 2; obtaining, by the wake-up control apparatus, an average wake-up interval according to K−1 wake-up intervals; and obtaining, by the wake-up control apparatus, a mean square error of the wake-up intervals according to the K−1 wake-up intervals and the average wake-up interval; and the determining, by the wake-up control apparatus, whether the type of being capable of waking up a terminal device is a type of repeatedly waking up a terminal device includes determining, by the wake-up control apparatus, whether the mean square error is a value belonging to a preset range; and if the wake-up control apparatus determines that the mean square error is the value belonging to the preset range, determining, by the wake-up control apparatus, that the type of being capable of waking up a terminal device is the type of repeatedly waking up a terminal device.

According to a second aspect, an embodiment of the present disclosure provides a wake-up control apparatus, including a determining unit configured to determine whether a network of a terminal device is in a connected state; and a processing unit configured to, if the determining unit determines that the network of the terminal device is not in the connected state, stop wake-up of the terminal device by N application wake-up timers, where N is an integer greater than or equal to 1.

In a first possible implementation manner of the second aspect, the apparatus further includes a resuming unit, where the determining unit is further configured to determine again whether the network of the terminal device is in the connected state; and the resuming unit is configured to, if the determining unit determines that the network of the terminal device is in the connected state, resume wake-up of the terminal device by the N application wake-up timers.

With reference to the first possible implementation manner of the second aspect, the apparatus further includes a first transferring unit configured to transfer N pieces of application wake-up timer information from a suspension list to a wake-up list, where the resuming unit is configured to resume wake-up of the terminal device by the application wake-up timers corresponding to the N pieces of application wake-up timer information in the wake-up list.

With reference to the second aspect or the first possible implementation manner of the second aspect or the second possible implementation manner of the second aspect, in a third possible implementation manner of the second aspect, the apparatus further includes a second transferring unit configured to transfer the N pieces of application wake-up timer information from the wake-up list to the suspension list, where the wake-up list includes M wake-up lists, and M is an integer greater than or equal to N; and the processing unit is configured to stop wake-up of the terminal device by the application wake-up timers corresponding to the N pieces of application wake-up timer information in the suspension list.

With reference to the third possible implementation manner of the second aspect, in a fourth possible implementation manner of the second aspect, the second transferring unit includes a first transferring subunit and/or a second transferring subunit, where the first transferring subunit is configured to transfer, according to application identifier information in a preset blacklist, application wake-up timer information that is in the wake-up list and includes the application identifier information in the preset blacklist to the suspension list, where the application wake-up timer information includes identifier information of an application to which an application wake-up timer belongs; and the second transferring subunit is configured to determine whether a type of an application wake-up timer in application wake-up timer information in the wake-up list is a type of being capable of waking up a terminal device, where the application wake-up timer information includes that the type of an application wake-up timer is the type of being capable of waking up a terminal device or a type of being incapable of waking up a terminal device; and if it is determined that the type of an application wake-up timer in the wake-up list is the type of being capable of waking up a terminal device, transfer the wake-up timer information that is in the wake-up list and includes the type of being capable of waking up a terminal device to the suspension list.

With reference to the fourth possible implementation manner of the second aspect, in a fifth possible implementation manner of the second aspect, if the second transferring subunit determines that the type of an application wake-up timer in the wake-up list is the type of being capable of waking up a terminal device, the second transferring unit further includes a first determining subunit configured to determine whether the type of being capable of waking up a terminal device is a type of being useless to wake up a terminal device; and the second transferring subunit is configured to, if the first determining subunit determines that the type of being capable of waking up a terminal device is the type of being useless to wake up a terminal device, transfer application wake-up timer information that is in the wake-up list and includes the type of being useless to wake up a terminal device to the suspension list.

With reference to the fourth possible implementation manner of the second aspect or the fifth possible implementation manner of the second aspect, in a sixth possible implementation manner of the second aspect, if the second transferring subunit determines that the type of an application wake-up timer in the wake-up list is the type of being capable of waking up a terminal device, the second transferring unit further includes a second determining subunit configured to determine whether the type of being capable of waking up a terminal device is a type of repeatedly waking up a terminal device; and the second transferring subunit is configured to, if the second determining subunit determines that the type of being capable of waking up a terminal device is the type of repeatedly waking up a terminal device, transfer application wake-up timer information that is in the wake-up list and includes the type of repeatedly waking up a terminal device to the suspension list.

With reference to the sixth possible implementation manner of the second aspect, in a seventh possible implementation manner of the second aspect, the second determining subunit is configured to determine whether the wake-up timer information includes a wake-up period; and if it is determined that the application wake-up timer information includes the wake-up period, determine that the type of being capable of waking up a terminal device is the type of repeatedly waking up a terminal device.

With reference to the sixth possible implementation manner of the second aspect, in an eighth possible implementation manner of the second aspect, the apparatus further includes an acquiring unit configured to acquire, within a preset time, wake-up intervals at which an application wake-up timer of the type of being capable of waking up a terminal device wakes up the terminal device K times, where K is an integer greater than or equal to 2; obtain an average wake-up interval according to K−1 wake-up intervals; and obtain a mean square error of the wake-up intervals according to the K−1 wake-up intervals and the average wake-up interval; and the second determining subunit is configured to determine whether a mean square error obtained by the acquiring subunit is a value belonging to a preset range; and if it is determined that the mean square error is the value belonging to the preset range, determine that the type of being capable of waking up a terminal device is a type of repeatedly waking up a terminal device.

According to a third aspect, an embodiment of the present disclosure provides a terminal device, including the foregoing wake-up control apparatus.

According to the wake-up control method and apparatus, and the terminal device provided in the embodiments of the present disclosure, a wake-up control apparatus determines whether a network of a terminal device is in a connected state, and if it is determined that the network of the terminal device is not in the connected state, stops wake-up of the terminal device by N application wake-up timers, where N is an integer greater than or equal to 1. The wake-up control apparatus shields some application wake-up timers, such that the shielded application wake-up timers do not wake up the terminal device, thereby reducing electricity consumption and power consumption of the terminal device.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
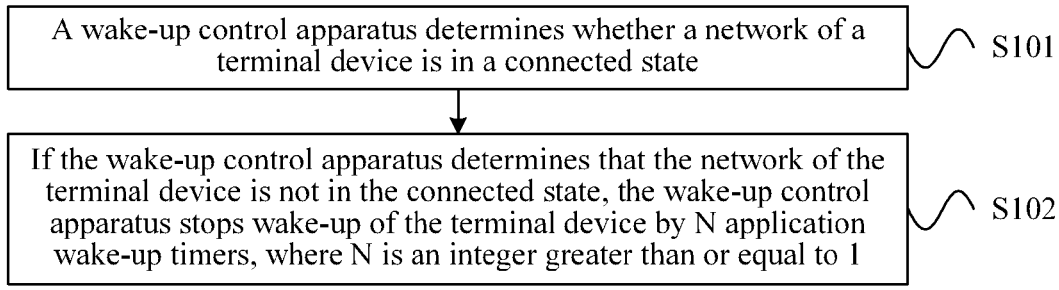
FIG. 1 is a flowchart of Embodiment 1 of a wake-up control method according to the present disclosure.

FIG. 1 is a flowchart of Embodiment 1 of a wake-up control method according to the present disclosure. As shown in FIG. 1, the method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state, and the method in this embodiment may include the following steps.

S101: The wake-up control apparatus determines whether a network of the terminal device is in a connected state.

In this embodiment, the network of the terminal device is a network to which the terminal device belongs. The wake-up control apparatus may determine whether the network of the terminal device is in the connected state. The network of the terminal device being in the connected state indicates a state in which a network is available, or the network of the terminal device being not in the connected state indicates a state in which no network is available. For example, that the network of the terminal device is in the connected state may be that a wireless fidelity (WIFI) network of the terminal device is in the connected state and a data network of the terminal device is in the connected state, or a WIFI network of the terminal device is in the connected state but a data network of the terminal device is not in the connected state, or a WIFI network of the terminal device is not in the connected state but a data network of the terminal device is in the connected state. That the network of the terminal device is not in the connected state may be that a WIFI network of the terminal device is not in the connected state and a data network of the terminal device is not in the connected state. When the wake-up control apparatus determines that the network of the terminal device is in the connected state, the terminal device may be woken up from the standby state. The terminal device is then connected to a corresponding server of each application by use of the network, and then the corresponding server of each application sends a synchronization message, a push message or the like back to the terminal device, so as to enable each application to synchronize with the corresponding server or acquire latest information. When the wake-up control apparatus determines that the network of the terminal device is not in the connected state, it indicates that the terminal device may not be woken up from the standby state, so as to reduce power consumption, and the wake-up control apparatus may perform S102.

S102: If the wake-up control apparatus determines that the network of the terminal device is not in the connected state, the wake-up control apparatus stops wake-up of the terminal device by N application wake-up timers, where N is an integer greater than or equal to 1.

When the network of the terminal device is not in the connected state, because wake-up timers are set in some applications in the prior art, these applications wake up the terminal device using the wake-up timers, that is, the wake-up timers wake up the device from the standby state (for example, a sleep state), so as to achieve an objective that the applications wake up the terminal device, where these wake-up timers are referred to as application wake-up timers in this embodiment. This causes an increase in electricity consumption of the terminal device, thereby increasing power consumption of the terminal device. In this embodiment, when the wake-up control apparatus determines that the network of the terminal device is not in the connected state, to prevent some applications from waking up the terminal device, that is, to prevent some application wake-up timers from waking up the terminal device, the wake-up control apparatus stops wake-up of the terminal device by the N application wake-up timers, where N is an integer greater than or equal to 1. That is, the wake-up control apparatus may shield the N application wake-up timers, to prevent the application wake-up timers from waking up the terminal device in a standby state. In this way, when these application wake-up timers expire, the terminal device is not woken up from the standby state, thereby reducing electricity consumption of the terminal device and reducing power consumption. It should be noted that, it may be predetermined that the N application wake-up timers need to stop waking up the terminal device when the network of the terminal device is not in the connected state.

In the wake-up control method provided in Embodiment 1 of the present disclosure, a wake-up control apparatus determines whether a network of a terminal device is in a connected state, and if it is determined that the network of the terminal device is not in the connected state, stops wake-up of the terminal device by N application wake-up timers, where N is an integer greater than or equal to 1. The wake-up control apparatus shields some application wake-up timers, such that the shielded application wake-up timers do not wake up the terminal device. In this case, the terminal device is not woken up when these application wake-up timers expire, thereby reducing electricity consumption and power consumption of the terminal device.

Figure 2:
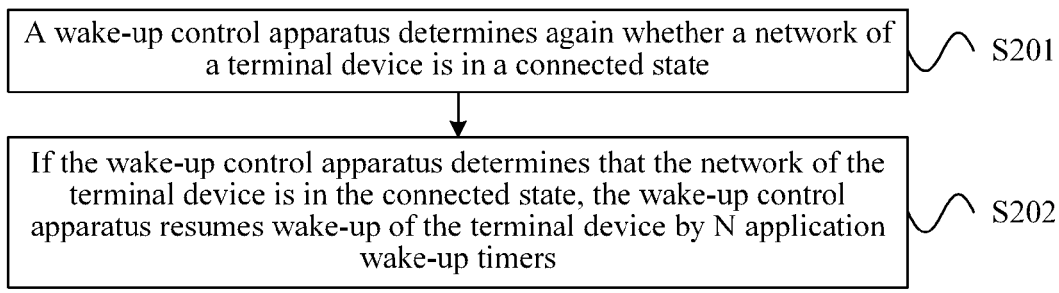
FIG. 2 is a flowchart of Embodiment 2 of a wake-up control method according to the present disclosure.

FIG. 2 is a flowchart of Embodiment 2 of a wake-up control method according to the present disclosure. As shown in FIG. 2, the method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state. The method in this embodiment is based on Embodiment 1 of the wake-up control method of the present disclosure shown in FIG. 1, and the method in this embodiment may further include the following steps.

S201: The wake-up control apparatus determines again whether the network of the terminal device is in the connected state.

In this embodiment, in this embodiment, S201 may be further performed after S102 shown in FIG. 1 is performed. That is, after the wake-up control apparatus stops wake-up of the terminal device by application wake-up timers corresponding to N pieces of application wake-up timer information in a suspension list, the network of the terminal device may be in the connected state, and therefore the wake-up control apparatus may further determine whether the network of the terminal device is in the connected state. If the network of the terminal device is not in the connected state, some applications do not need to wake up the terminal device using application wake-up timers, so as to reduce power consumption. If the network of the terminal device is in the connected state, it indicates that an application may wake up the terminal device using an application wake-up timer, and the wake-up control apparatus performs S202.

S202: If the wake-up control apparatus determines that the network of the terminal device is in the connected state, the wake-up control apparatus resumes wake-up of the terminal device by the N application wake-up timers.

In this embodiment, if the wake-up control apparatus determines that the network of the terminal device is in the connected state, it indicates that an application may wake up the terminal device using an application wake-up timer, and the wake-up timers corresponding to the N pieces of wake-up timer information are resumed. Therefore, when the wake-up control apparatus determines that the network of the terminal device is in the connected state, to enable some applications to wake up the terminal device, that is, to enable some application wake-up timers to wake up the terminal device, the wake-up control device resumes wake-up of the terminal device by the N application wake-up timers, so as to enable the application wake-up timers to wake up the terminal device in the standby state. In this way, the terminal device is woken up from the standby state when these application wake-up timers expire, and is connected to corresponding servers of the applications by use of the network, thereby ensuring that the applications synchronize with the corresponding servers or acquire latest information.

In the wake-up control method provided in Embodiment 2 of the present disclosure, a wake-up control apparatus determines again whether a network of a terminal device is in a connected state, and if it is determined that the network of the terminal device is in the connected state, resumes wake-up of the terminal device by N application wake-up timers. The wake-up control apparatus resumes some application wake-up timers, to enable the resumed application wake-up timers to wake up the terminal device, such that the terminal device is connected to corresponding servers of applications by use of the network, thereby ensuring that the applications synchronize with the corresponding servers or acquire latest information.

Figure 3:
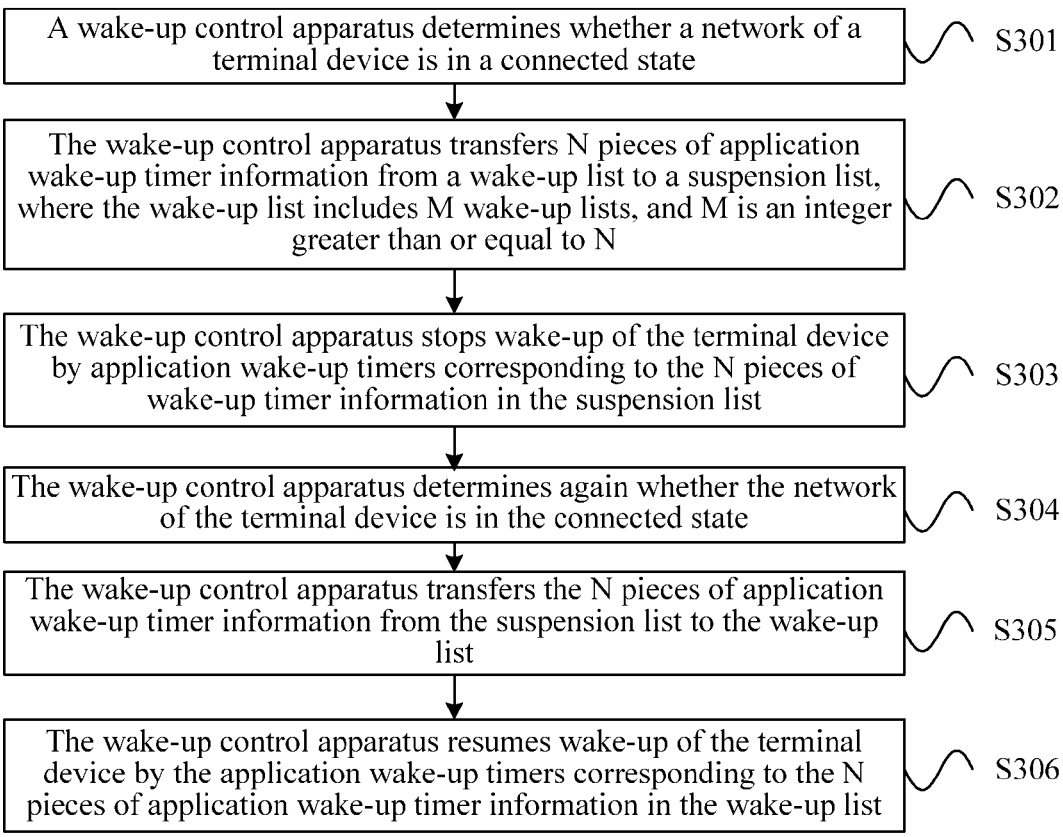
FIG. 3 is a flowchart of Embodiment 3 of a wake-up control method according to the present disclosure.

FIG. 3 is a flowchart of Embodiment 3 of a wake-up control method according to the present disclosure. As shown in FIG. 3, the method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state, and the method in this embodiment may include the following steps.

S301: The wake-up control apparatus determines whether a network of the terminal device is in a connected state.

In this embodiment, the wake-up control apparatus may determine whether the network of the terminal device is in the connected state. The network of the terminal device being in the connected state indicates a state in which a network is available, or the network of the terminal device being not in the connected state indicates a state in which no network is available. For example, that the network of the terminal device is in the connected state may be that a WIFI network of the terminal device is in the connected state and a data network of the terminal device is in the connected state, or a WIFI network of the terminal device is in the connected state but a data network of the terminal device is not in the connected state, or a WIFI network of the terminal device is not in the connected state but a data network of the terminal device is in the connected state. That the network of the terminal device is not in the connected state may be that a WIFI network of the terminal device is not in the connected state and a data network of the terminal device is not in the connected state. When the wake-up control apparatus determines that the network of the terminal device is in the connected state, the terminal device may be woken up from the standby state. The terminal device is then connected to a corresponding server of each application by use of the network, and then the corresponding server of each application sends a synchronization message, a push message or the like back to the terminal device, so as to enable each application to synchronize with the corresponding server or acquire latest information. When the wake-up control apparatus determines that the network of the terminal device is not in the connected state, it indicates that the terminal device may not be woken up from the standby state, so as to reduce power consumption, and the wake-up control apparatus may perform S302.

S302: The wake-up control apparatus transfers N pieces of application wake-up timer information from a wake-up list to a suspension list, where the wake-up list includes M wake-up lists, and M is an integer greater than or equal to N.

In this embodiment, an application wake-up timer has one piece of application wake-up timer information that is in a one-to-one correspondence with the application wake-up timer. When the wake-up control apparatus determines that the terminal device is not in the connected state, that is, the terminal device is previously in the connected state, all pieces of application wake-up timer information are recorded in the wake-up list, such that application wake-up timers corresponding to these pieces of application wake-up timer information may wake up the terminal device in the standby state. Therefore, M pieces of application wake-up timer information may be recorded in the wake-up list, where M is an integer greater than or equal to N, and N is an integer greater than or equal to 1. When the wake-up control apparatus determines that the network of the terminal device is not in the connected state, to prevent some applications from waking up the terminal device, that is, to prevent some application wake-up timers from waking up the terminal device, the wake-up control apparatus transfers the N pieces of application wake-up timer information from the wake-up list to the suspension list. That is, the N pieces of application wake-up timer information are added to the suspension list, and the N pieces of application wake-up timer information are deleted from the wake-up list.

The suspension list and the wake-up list may be managed by a first transferring unit and/or a second transferring unit and the like in the wake-up control apparatus, or may be managed by another module or unit, related to the suspension list and the wake-up list, in the wake-up control apparatus.

S303: The wake-up control apparatus stops wake-up of the terminal device by application wake-up timers corresponding to the N pieces of wake-up timer information in the suspension list.

In this embodiment, after the wake-up control apparatus transfers the N pieces of application wake-up timer information from the wake-up list to the suspension list, the suspension list records the N pieces of application wake-up timer information. Therefore, when the wake-up control apparatus determines that the network of the terminal device is not in the connected state, to prevent some applications from waking up the terminal device, that is, to prevent some application wake-up timers from waking up the terminal device, the wake-up control apparatus stops wake-up of the terminal device by the application wake-up timers corresponding to the N pieces of application wake-up timer information in the suspension list. That is, the wake-up control apparatus may suspend the application wake-up timers corresponding to the N pieces of application wake-up timer information in the suspension list, to prevent the application wake-up timers from waking up the terminal device in the standby state. In this way, when these application wake-up timers expire, the terminal device is not woken up from the standby state, thereby reducing electricity consumption of the terminal device and reducing power consumption.

S304: The wake-up control apparatus determines again whether the network of the terminal device is in the connected state.

In this embodiment, after the wake-up control apparatus transfers the N pieces of application wake-up timing information from the wake-up list to the suspension list, and stops wake-up of the terminal device by the wake-up timers corresponding to the N pieces of application wake-up timer information in the suspension list, the network of the terminal device may be in the connected state, and the wake-up control apparatus may determine again whether the network of the terminal device is in the connected state. If the network of the terminal device is not in the connected state, some applications do not need to wake up the terminal device using application wake-up timers, so as to reduce power consumption. If the network of the terminal device is in the connected state, it indicates that an application may wake up the terminal device using an application wake-up timer, and the wake-up control apparatus performs S305.

It should be noted that, when a change occurs in the network in which the terminal device is located, the terminal device sends a network status change message. After receiving the network status change message sent by the terminal device, the wake-up control apparatus may detect whether the network is in the connected state. A process in which the terminal device detects a change in the network is the same as that in the prior art, and details are not described in this embodiment of the present disclosure.

S305: The wake-up control apparatus transfers the N pieces of application wake-up timer information from the suspension list to the wake-up list.

In this embodiment, when the wake-up control apparatus determines that the terminal device is in the connected state, that is, the terminal device is previously not in the connected state, the N pieces of wake-up timer information are recorded in the suspension list, such that the application wake-up timers corresponding to the N pieces of wake-up timer information may not wake up the terminal device in the standby state. When the wake-up control apparatus determines that the network of the terminal device is in the connected state, to enable the foregoing applications that do not wake up the terminal device to wake up the terminal device again, that is, to enable these application wake-up timers to wake up the terminal device, the wake-up control apparatus transfers the N pieces of application wake-up timer information from the suspension list to the wake-up list. That is, the N pieces of application wake-up timer information are added to the wake-up list, and the N pieces of application wake-up timer information are deleted from the suspension list.

S306: The wake-up control apparatus resumes wake-up of the terminal device by the application wake-up timers corresponding to the N pieces of application wake-up timer information in the wake-up list.

In this embodiment, after the wake-up control apparatus transfers the N pieces of application wake-up timer information from the suspension list to the wake-up list, the N pieces of application wake-up timer information are recorded in the wake-up list again. Therefore, when the wake-up control apparatus determines that the network of the terminal device is in the connected state, to enable the foregoing N applications to wake up the terminal device, that is, to enable the N application wake-up timers to wake up the terminal device, the wake-up control device resumes wake-up of the terminal device by the application wake-up timers corresponding to the N pieces of application wake-up timer information in the wake-up list. That is, the wake-up control apparatus may resume the application wake-up timers corresponding to the N pieces of application wake-up timer information in the wake-up list, to enable the application wake-up timers to wake up the terminal device in the standby state. In this way, the terminal device is woken up from the standby state when these application wake-up timers expire, and is connected to corresponding servers of these applications by use of the network, thereby ensuring that these applications synchronize with the corresponding servers or acquire latest information.

In the wake-up control method provided in Embodiment 3 of the present disclosure, when determining that a network of a terminal device is not in a connected state, a wake-up control apparatus transfers N pieces of application wake-up timer information from a wake-up list to a suspension list, where the wake-up list includes M wake-up lists, and M is an integer greater than or equal to N, and stops wake-up of the terminal device by application wake-up timers corresponding to the N pieces of wake-up timer information in the suspension list. When determining that the network of the terminal device is in the connected state, the wake-up control apparatus transfers the N pieces of application wake-up timer information from the suspension list to the wake-up list, and resumes wake-up of the terminal device by the application wake-up timers corresponding to the N pieces of application wake-up timer information in the wake-up list. The wake-up control apparatus shields the N application wake-up timers, such that the N shielded application wake-up timers do not wake up the terminal device. In this way, the terminal device is not woken up when these application wake-up timers expire, thereby reducing electricity consumption and power consumption of the terminal device. Moreover, it is further implemented that when the network of the terminal device is in the connected state, the wake-up control apparatus resumes some application wake-up timers, so as to resume wake-up of the terminal device by the application wake-up timers. This ensures original wake-up behaviors of the applications, and enables the terminal device to be connected to corresponding servers of the applications by use of the network, thereby ensuring that the applications synchronize with the corresponding servers or acquire latest information.

In Embodiment 4 of a wake-up control method according to the present disclosure, the method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state. The method in this embodiment is based on Embodiment 3 of the wake-up control method according to the present disclosure shown in FIG. 3. Furthermore, S302 shown in FIG. 3 may include transferring, by the wake-up control apparatus, according to application identifier information in a preset blacklist, application wake-up timer information that is in the wake-up list and includes the application identifier information in the preset blacklist to the suspension list, where the application wake-up timer information includes identifier information of an application to which an application wake-up timer belongs.

In this embodiment, a blacklist is preset, where the preset blacklist records identifier information of at least one application. It should be noted that the application identifier information recorded in the preset blacklist may be set according to experience or an actual application scenario, and this embodiment of the present disclosure is not limited thereto. When the network of the terminal device is not in the connected state, an application wake-up timer corresponding to the application identifier information recorded in the preset blacklist may not wake up the terminal device, so as to reduce power consumption. A wake-up list records N pieces of application wake-up timer information, and each piece of application wake-up timer information in this embodiment includes identifier information of an application to which an application wake-up timer belongs. Therefore, when the wake-up control apparatus determines that the network of the terminal device is not in the connected state, it may be determined whether application wake-up timer information is recorded in the wake-up list. If no, the process is ended; if yes, the wake-up control apparatus traverses the wake-up list, and compares application identifier information in the application wake-up timer information in the wake-up list with the application identifier information in the preset blacklist, to check whether the wake-up list includes application identifier information the same as the application identifier information in the preset blacklist. If no, the process is ended; if yes, the wake-up control apparatus transfers application wake-up timing information that is in the wake-up list and includes the application identifier information in the preset blacklist to the suspension list.

In the wake-up control method provided in Embodiment 4 of the present disclosure, a wake-up control apparatus transfers, according to application identifier information in a preset blacklist, application wake-up timer information that is in a wake-up list and includes the application identifier information in the preset blacklist to a suspension list, which can improve efficiency of determining which pieces of application wake-up timer information are to be transferred from the wake-up list to the suspension list.

Figure 4:
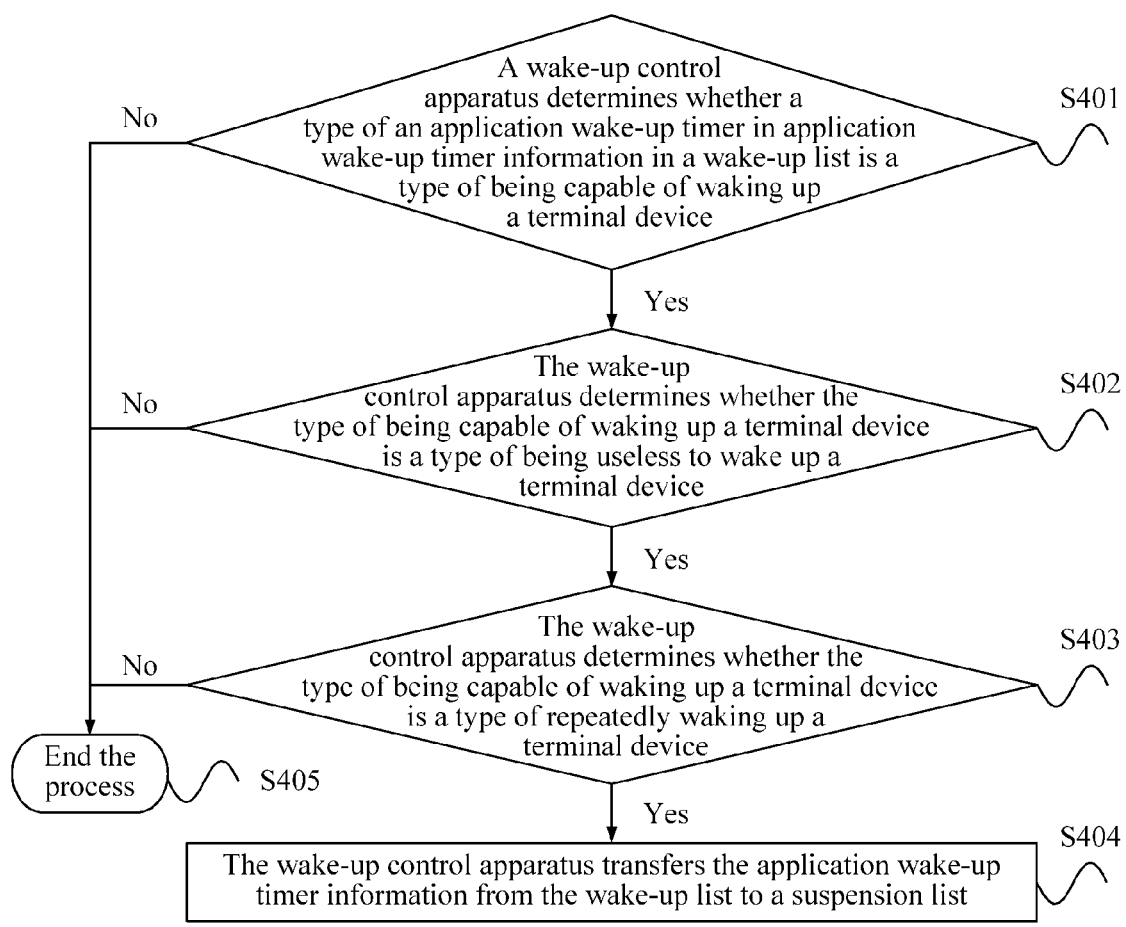
FIG. 4 is a flowchart of Embodiment 5 of a wake-up control method according to the present disclosure.

FIG. 4 is a flowchart of Embodiment 5 of a wake-up control method according to the present disclosure. The method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state. The method in this embodiment is based on Embodiment 3 of the wake-up control method according to the present disclosure shown in FIG. 3, and furthermore, S302 shown in FIG. 3 may include the following steps.

S401: The wake-up control apparatus determines whether a type of an application wake-up timer in application wake-up timer information in the wake-up list is a type of being capable of waking up a terminal device. If no, perform S405; if yes, perform S402.

In this embodiment, the application wake-up timer information includes that the type of an application wake-up timer is the type of being capable of waking up a terminal device or a type of being incapable of waking up a terminal device. That is, each piece of application wake-up timer information includes a type of an application wake-up timer, and the type of the application wake-up timer is the type of being capable of waking up a terminal device, or the type of the application wake-up timer is the type of being incapable of waking up a terminal device. Therefore, when a wake-up controller determines that the network of the terminal device is not in the connected state, the wake-up control apparatus determines whether the type of an application wake-up timer in the application wake-up timer information is the type of being capable of waking up a terminal device. If the wake-up control apparatus determines that the type of the application wake-up timer in the application wake-up timer information is the type of being incapable of waking up a terminal device, it indicates that the application wake-up timer does not wake up the terminal device, and S405 is performed. If the wake-up control apparatus determines that the type of the application wake-up timer in the application wake-up timer information is the type of being capable of waking up a terminal device, S402 is performed.

It should be noted that, if the wake-up control apparatus determines that the type of the application wake-up timer in the application wake-up timer information in the wake-up list is the type of being capable of waking up a terminal device, it is considered that the application wake-up timer of the type of being capable of waking up a terminal device may not wake up the terminal device when the network of the terminal device is not in the connected state, and the determined application wake-up timer that includes the type of being capable of waking up a terminal device is transferred to the suspension list. Alternatively, if the wake-up control apparatus determines that the type of the application wake-up timer in the application wake-up timer information in the wake-up list is the type of being capable of waking up a terminal device, furthermore, S402 may be further performed to determine whether the type of being capable of waking up a terminal device is a type of being useless to wake up a terminal device. Alternatively, if the wake-up control apparatus determines that the type of the application wake-up timer in the application wake-up timer information in the wake-up list is the type of being capable of waking up a terminal device, furthermore, S403 may be further performed to determine whether the type of being capable of waking up a terminal device is a type of repeatedly waking up a terminal device.

S402: The wake-up control apparatus determines whether the type of being capable of waking up a terminal device is a type of being useless to wake up a terminal device. If no, perform S405; if yes, perform S403.

In this embodiment, after determining the application wake-up control information that includes the type of being capable of waking up a terminal device, the wake-up control apparatus may further determine whether the type of being capable of waking up a terminal device is the type of being useless to wake up a terminal device. If the wake-up control apparatus determines that the type of being capable of waking up a terminal device is the type of being useless to wake up a terminal device, where the type of being useless to wake up a terminal device indicates that waking up, by an application wake-up timer, a terminal device in a standby state is meaningless to a user, it indicates that the application wake-up timer may wake up the terminal device when the network of the terminal device is not in the connected state, and S405 is performed. If the wake-up control apparatus determines that the type of being capable of waking up a terminal device is a type of being useful to wake up a terminal device, S403 is performed.

It should be noted that if the wake-up control apparatus determines that the type of being capable of waking up a terminal device is the type of being useless to wake up a terminal device, it is considered that the application wake-up timer of the type of being capable of waking up a terminal device may not wake up the terminal device when the network of the terminal device is not in the connected state, and these application wake-up timers including the type of being capable of waking up a terminal device are transferred to the suspension list. Alternatively, if the wake-up control apparatus determines that the type of being capable of waking up a terminal device is the type of being useless to wake up a terminal device, furthermore, S403 may be further performed to determine whether the type of being capable of waking up a terminal device is a type of repeatedly waking up a terminal device.

S403: The wake-up control apparatus determines whether the type of being capable of waking up a terminal device is a type of repeatedly waking up a terminal device. If not, perform S405; if yes, perform S404.

In this embodiment, the wake-up control apparatus may further determine whether the type of being capable of waking up a terminal device is repeatedly waking up a terminal device. If the wake-up control apparatus determines that the type of being useless to wake up a terminal device, which is determined using S402, is not the type of repeatedly waking up a terminal device, it indicates that the application wake-up timer may wake up the terminal device when the network of the terminal device is not in the connected state, and S405 is performed. If the wake-up control apparatus determines that the type of being useless to wake up a terminal device, which is determined using S402, is the type of repeatedly waking up a terminal device, S404 is performed.

Furthermore, the following three manners may be used for an implementation process in which the wake-up control apparatus determines whether the type of being capable of waking up a terminal device is the type of repeatedly waking up a terminal device.

In a first feasible implementation manner, the wake-up control apparatus determines whether the wake-up timer information includes a wake-up period; if the wake-up control apparatus determines that the application wake-up timer information includes the wake-up period, the wake-up control apparatus determines that the type of being capable of waking up a terminal device is the type of repeatedly waking up a terminal device. If an application wake-up timer is an application wake-up timer that repeatedly wakes up the terminal device, the application wake-up timer has a wake-up period, and information about the application wake-up timer in the wake-up list records the wake-up period. Therefore, the wake-up control apparatus may determine whether application wake-up timer information that is in the wake-up list and includes the type of being capable of waking up a terminal device includes a wake-up period. If the application wake-up timer information includes the wake-up period, the wake-up control apparatus may determine that the type of being capable of waking up a terminal device is the type of repeatedly waking up a terminal device. If the application wake-up timer information does not include the wake-up period, the wake-up control apparatus may consider that the type of being capable of waking up a terminal device is not the type of repeatedly waking up a terminal device.

In a second feasible implementation manner, the wake-up control apparatus determines whether a mean square error of wake-up intervals at which an application wake-up timer of the type of being capable of waking up a terminal device wakes up the terminal device is a value belonging to a preset range. If the wake-up control apparatus determines that the mean square error is the value belonging to the preset range, the wake-up control apparatus determines that the type of being capable of waking up a terminal device is the type of repeatedly waking up a terminal device. The mean square error may be obtained in the following manner: acquiring, by the wake-up control apparatus within a preset time, wake-up intervals at which the application wake-up timer of the type of being capable of waking up a terminal device wakes up the terminal device K times, where K is an integer greater than or equal to 2; obtaining, by the wake-up control apparatus, an average wake-up interval according to K−1 wake-up intervals; and obtaining, by the wake-up control apparatus, the mean square error of the wake-up intervals according to the K−1 wake-up intervals and the average wake-up interval. For example, the application wake-up timer wakes up the terminal device four times within the preset time, and therefore, three wake-up intervals exist within the preset time.

For example, a formula of calculating the average wake-up interval may be:

$$\mu = \frac{1}{K-1}\sum_{i=1}^{K-1} x_i,$$

where $\mu$ is the average wake-up interval, and $x_i$ is an $i^{th}$ wake-up interval.

For example, a formula of calculating the mean square error of wake-up intervals may be:

$$\sigma = \sqrt{\frac{1}{K-1}\sum_{i}^{K-1}(x_i - \mu)^2},$$

where $\sigma$ is the mean square error of wake-up intervals.

It should be noted that an order of performing S402 and S403 is not limited in this embodiment.

S404: The wake-up control apparatus transfers the application wake-up timer information from the wake-up list to the suspension list.

In this embodiment, the wake-up control apparatus transfers the determined application wake-up timer information (including the type of being capable of waking up a terminal device, where the type of being capable of waking up a terminal device is the type of repeatedly waking up a terminal device and is the type of being useless to wake up a terminal device at the same time) to the suspension list.

S405: End the process.

In this embodiment, if the wake-up control apparatus determines that a type of an application wake-up timer in application wake-up timer information is the type of being incapable of waking up a terminal device, it indicates that the application wake-up timer does not wake up the terminal device, and the wake-up control apparatus ends the process. Alternatively, if the wake-up control apparatus determines that the type of being capable of waking up a terminal device is not the type of repeatedly waking up a terminal device, it indicates that the application wake-up timer may wake up the terminal device when the network of the terminal device is not in the connected state, and the wake-up control apparatus ends the process. Alternatively, if the wake-up control apparatus determines that the type of being capable of waking up a terminal device is the type of being useful to wake up a terminal device, it indicates that the application wake-up timer may wake up the terminal device when the network of the terminal device is not in the connected state, and the wake-up control apparatus ends the process.

In the wake-up control method provided in Embodiment 5 of the present disclosure, a wake-up control apparatus determines that a type of an application wake-up timer in application wake-up timer information is a type of being capable of waking up a terminal device, determines that the type of being capable of waking up a terminal device is a type of repeatedly waking up a terminal device, further determines that the type of being capable of waking up a terminal device is a type of being useful to wake up a terminal device, and then transfers the determined application wake-up timer information including the type of being capable of waking up a terminal device to a suspension list. This can increase accuracy of determining N pieces of application wake-up timer information in a wake-up list that are to be transferred to the suspension list.

In Embodiment 6 of a wake-up control method according to the present disclosure, the method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state, and the method in this embodiment is based on Embodiment 3 of the wake-up control method according to the present disclosure shown in FIG. 3. Furthermore, S302 shown in FIG. 3 may include transferring, by the wake-up control apparatus, according to application identifier information in a preset blacklist, application wake-up timer information that is in the wake-up list and includes the application identifier information in the preset blacklist to the suspension list, where the application wake-up timer information includes identifier information of an application to which an application wake-up timer belongs. Then, the wake-up control apparatus further determines whether a type of an application wake-up timer in remaining application wake-up timer information in the wake-up list is a type of being capable of waking up a terminal device, the wake-up control apparatus determines whether the type of being capable of waking up a terminal device is a type of repeatedly waking up a terminal device, and the wake-up control apparatus determines whether the type of being capable of waking up a terminal device is a type of being useless to wake up a terminal device. If the wake-up control apparatus determines that the type of an application wake-up timer in the remaining application wake-up timer information in the wake-up list is the type of being capable of waking up a terminal device, is the type of repeatedly waking up a terminal device, and is the type of being useless to wake up a terminal device, the wake-up control apparatus transfers the application wake-up timer information to the suspension list; otherwise, the process is ended.

The wake-up control method provided in Embodiment 6 of the present disclosure not only can improve efficiency of determining N pieces of application wake-up timer information in a wake-up list that are to be transferred to a suspension list, but also can increase accuracy of determining the N pieces of application wake-up timer information in the wake-up list that are to be transferred to the suspension list.

Figure 5:
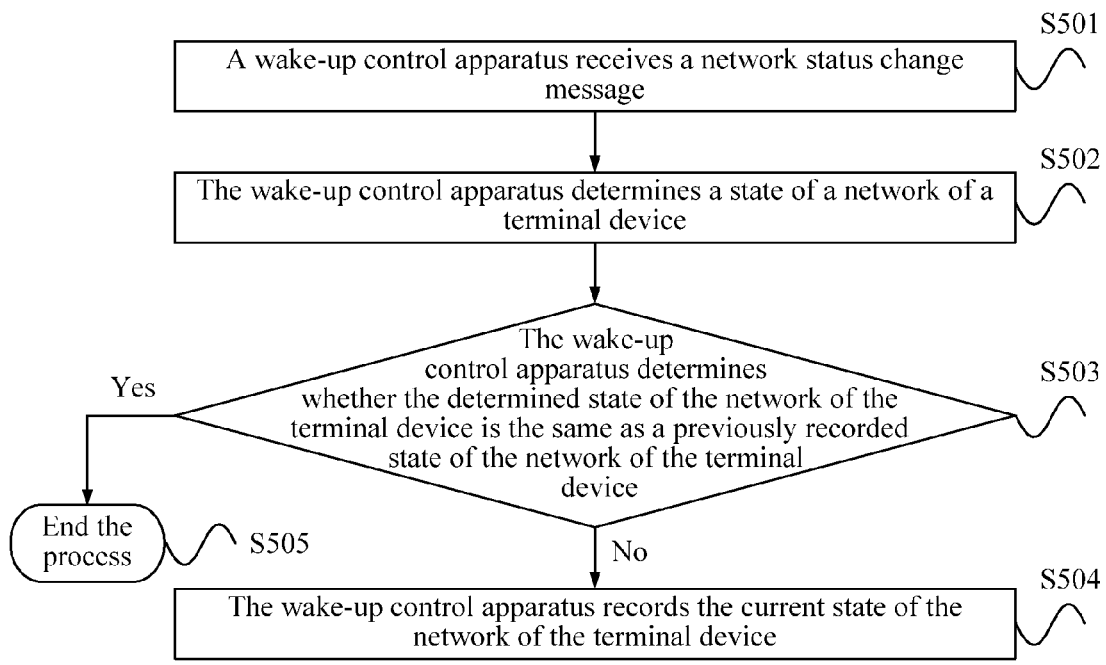
FIG. 5 is a flowchart of Embodiment 7 of a wake-up control method according to the present disclosure.

FIG. 5 is a flowchart of Embodiment 7 of a wake-up control method according to the present disclosure. As shown in FIG. 5, the method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state. The method in this embodiment is based on any one embodiment of Embodiment 1 to Embodiment 6 of the wake-up control method according to the present disclosure. The method in this embodiment may further include the following steps.

S501: The wake-up control apparatus receives a network status change message.

In this embodiment, a change occurs in the network of the terminal device, for example, the WIFI network of the terminal device is switched between being in the connected state and being not in the connected state, and/or the data network of the terminal device is switched between being in the connected state and being not in the connected state. When change occurs in the network of the terminal device, the terminal device sends the network status change message to the wake-up control apparatus.

S502: The wake-up control apparatus determines a state of the network of the terminal device.

In this embodiment, after receiving the network status change message, the wake-up control apparatus then determines a state of the network of the terminal device, that is, determines whether the network of the terminal device is in the connected state or is not in the connected state.

S503: The wake-up control apparatus determines whether the determined state of the network of the terminal device is the same as a previously recorded state of the network of the terminal device. If yes, perform S505; if not, perform S504.

In this embodiment, the wake-up control apparatus determines whether the determined state of the network of the terminal device is the same as the previously recorded state of the network of the terminal device. If the states are same, S505 is performed; if the states are different, S504 is performed.

If the previously recorded state of the network of the terminal device is the connected state, and the currently determined state of the network of the terminal device is the connected state, S505 is performed. If the previously recorded state of the network of the terminal device is the connected state, and the currently determined state of the network of the terminal device is not the connected state, S504 is performed.

If the previously recorded state of the network of the terminal device is not the connected state, and the currently determined state of the network of the terminal device is not the connected state, S505 is performed. If the previously recorded state of the network of the terminal device is not the connected state, and the currently determined state of the network of the terminal device is the connected state, S504 is performed.

S504: The wake-up control apparatus records the current state of the network of the terminal device.

In this embodiment, when the wake-up control apparatus determines that the determined state of the network of the terminal device is different from the previously recorded state of the network of the terminal device, the current state of the network of the terminal device is recorded, such that when the state of the network of the terminal device changes next time, it is determined whether the current state of the network of the terminal device is the same as a next state of the network of the terminal device.

S505: End the process.

In this embodiment, if the wake-up control apparatus determines that the determined state of the network of the terminal device is the same as the previously recorded state of the network of the terminal device, the process is ended.

In Embodiment 8 of a wake-up control method of the present disclosure, the method in this embodiment may be implemented using a wake-up control apparatus, and this apparatus may be integrated in a terminal device to implement the method in this embodiment. The terminal device may be a mobile phone, a tablet computer, a notebook computer, a desktop computer, and the like, and this embodiment is not limited thereto. An application scenario of this embodiment of the present disclosure is that a terminal device is in a standby state, and the method in this embodiment is based on any embodiment of Embodiment 1 to Embodiment 7 of the wake-up control method of the present disclosure. Furthermore, the method may further include acquiring, by the wake-up control apparatus, a set value that is input, where the set value is used for instructing the wake-up control apparatus to be automatically turned off or automatically turned on; when the wake-up control apparatus is in an on state and the set value is used for instructing the wake-up control apparatus to be automatically turned off, automatically turning off the wake-up control apparatus according to the set value; and when the wake-up control apparatus is in an off state and the set value is used for instructing the wake-up control apparatus to be automatically turned on, automatically turning on the wake-up control apparatus according to the set value.

It should be noted that after the wake-up control apparatus is automatically turned off, the wake-up control apparatus no longer performs any one method embodiment of Embodiment 1 to Embodiment 7 of the method in the present disclosure. After the wake-up control apparatus is automatically turned on, the wake-up control apparatus may perform any one method embodiment of Embodiment 1 to Embodiment 7 of the method in the present disclosure.

Furthermore, before the wake-up control apparatus of the present disclosure receives the network status change message, the method further includes determining that the wake-up control apparatus is in the on state. In this case, when the wake-up control apparatus is in the on state, the wake-up control apparatus performs any one method embodiment of Embodiment 1 to Embodiment 7 of the method in the present disclosure.

Figure 6:
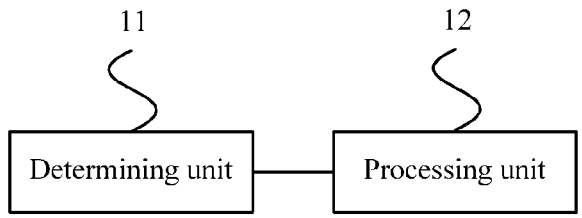
FIG. 6 is a schematic structural diagram of Embodiment 1 of a wake-up control apparatus according to the present disclosure.

FIG. 6 is a schematic structural diagram of Embodiment 1 of a wake-up control apparatus according to the present disclosure. As shown in FIG. 6, the apparatus in this embodiment may include a determining unit 11 and a processing unit 12. The determining unit 11 is configured to determine whether a network of a terminal device is in a connected state; and the processing unit 12 is configured to, if the determining unit 11 determines that the network of the terminal device is not in the connected state, stop wake-up of the terminal device by N application wake-up timers, where N is an integer greater than or equal to 1.

The apparatus in this embodiment may be used to perform the technical solutions in the foregoing method embodiments of the present disclosure, implementation principles and technical effects of the technical solutions are similar, and reference may be made to related descriptions in the foregoing method embodiments of the present disclosure for details, which are not described herein again.

Figure 7:
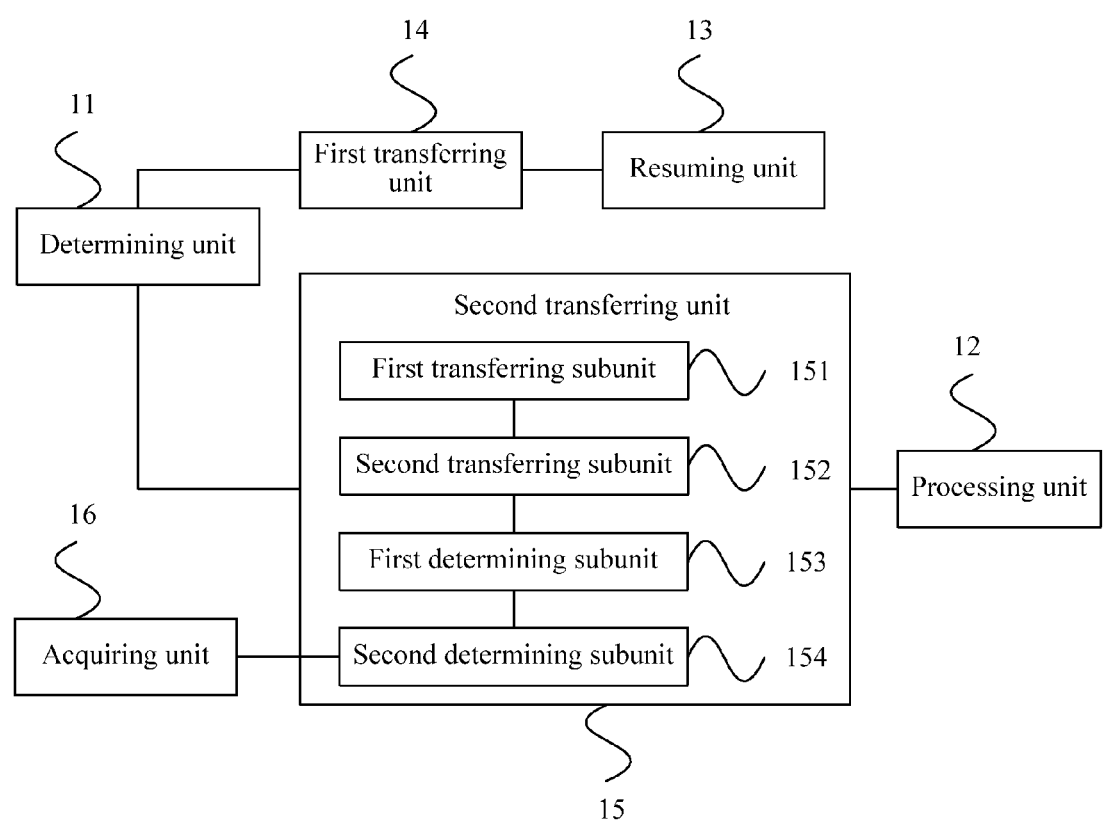
FIG. 7 is a schematic structural diagram of Embodiment 2 of a wake-up control apparatus according to the present disclosure.

FIG. 7 is a schematic structural diagram of Embodiment 2 of a wake-up control apparatus according to the present disclosure. As shown in FIG. 7, on the basis of the apparatus structure shown in FIG. 6, the apparatus in this embodiment may further include a resuming unit 13. The determining unit 11 is further configured to determine again whether the network of the terminal device is in the connected state; and the resuming unit 13 is configured to, if the determining unit 11 determines that the network of the terminal device is in the connected state, resume wake-up of the terminal device by the N application wake-up timers.

Furthermore, the apparatus in this embodiment further includes a first transferring unit 14. The first transferring unit 14 is configured to transfer N pieces of application wake-up timer information from a suspension list to a wake-up list; and the resuming unit 13 is configured to resume wake-up of the terminal device by the application wake-up timers corresponding to the N pieces of application wake-up timer information in the wake-up list.

Furthermore, the apparatus in this embodiment further includes a second transferring unit 15. The second transferring unit 15 is configured to transfer the N pieces of application wake-up timer information from the wake-up list to the suspension list, where the wake-up list includes M wake-up lists, and M is an integer greater than or equal to N; and the processing unit 12 is configured to stop wake-up of the terminal device by the application wake-up timers corresponding to the N pieces of application wake-up timer information in the suspension list.

Preferably, the apparatus in this embodiment further includes a first transferring subunit 151 and/or a second transferring subunit 152. The first transferring subunit 151 is configured to transfer, according to application identifier information in a preset blacklist, application wake-up timer information that is in the wake-up list and includes the application identifier information in the preset blacklist to the suspension list, where the application wake-up timer information includes identifier information of an application to which an application wake-up timer belongs; and the second transferring subunit 152 is configured to determine whether a type of an application wake-up timer in application wake-up timer information in the wake-up list is a type of being capable of waking up a terminal device, where the application wake-up timer information includes that the type of an application wake-up timer is the type of being capable of waking up a terminal device or a type of being incapable of waking up a terminal device; and if it is determined that the type of an application wake-up timer in the wake-up list is the type of being capable of waking up a terminal device, transfer wake-up timer information that is in the wake-up list and includes the type of being capable of waking up a terminal device to the suspension list.

Furthermore, if the second transferring subunit 152 determines that the type of an application wake-up timer in the wake-up list is the type of being capable of waking up a terminal device, the second transferring unit 15 further includes a first determining subunit 153. The first determining subunit 153 is configured to determine whether the type of being capable of waking up a terminal device is a type of being useless to wake up a terminal device; and the second transferring subunit 152 is configured to, if the first determining subunit 153 determines that the type of being capable of waking up a terminal device is the type of being useless to wake up a terminal device, transfer application wake-up timer information that is in the wake-up list and includes the type of being useless to wake up a terminal device to the suspension list.

Still furthermore, if the second transferring subunit 152 determines that the type of an application wake-up timer in the wake-up list is the type of being capable of waking up a terminal device, the second transferring unit 15 further includes a second determining subunit 154. The second determining subunit 154 is configured to determine whether the type of being capable of waking up a terminal device is a type of repeatedly waking up a terminal device; and the second transferring subunit 152 is configured to, if the second determining subunit 154 determines that the type of being capable of waking up a terminal device is the type of repeatedly waking up a terminal device, transfer application wake-up timer information that is in the wake-up list and includes the type of repeatedly waking up a terminal device to the suspension list.

Optionally, the second determining subunit 154 is configured to determine whether the wake-up timer information includes a wake-up period; and if it is determined that the application wake-up timer information includes the wake-up period, determine that the type of being capable of waking up a terminal device is the type of repeatedly waking up a terminal device.

Optionally, the apparatus in this embodiment further includes an acquiring unit 16. The acquiring unit 16 is configured to acquire, within a preset time, wake-up intervals at which an application wake-up timer of the type of being capable of waking up a terminal device wakes up the terminal device K times, where K is an integer greater than or equal to 2; obtain an average wake-up interval according to K−1 wake-up intervals; and obtain a mean square error of the wake-up intervals according to the K−1 wake-up intervals and the average wake-up interval. The second determining subunit 154 is configured to determine whether a mean square error obtained by the acquiring subunit is a value belonging to a preset range; and if it is determined that the mean square error is the value belonging to the preset range, determine that the type of being capable of waking up a terminal device is the type of repeatedly waking up a terminal device.

The apparatus in this embodiment may be used to perform the technical solutions in the foregoing method embodiments of the present disclosure, implementation principles and technical effects of the technical solutions are similar, and reference may be made to related descriptions in the foregoing method embodiments of the present disclosure for details, which are not described herein again.

Figure 8:
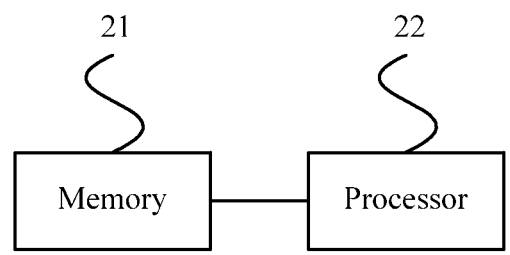
FIG. 8 is a schematic structural diagram of Embodiment 3 of a wake-up control apparatus according to the present disclosure.

FIG. 8 is a schematic structural diagram of Embodiment 3 of a wake-up control apparatus according to the present disclosure. As shown in FIG. 8, the apparatus in this embodiment includes a memory 21 and a processor 22 connected to the memory 21, where the memory 21 stores a group of program code, and the memory 21 may include a non-volatile memory. The processor 22 may be a central processing unit (CPU), or an application-specific integrated circuit (ASIC), or is configured to be one or more integrated circuits that implement this embodiment of the present disclosure. The processor 22 is configured to invoke the program code stored in the memory 21, to perform the following operations: determining whether a network of a terminal device is in a connected state; and if it is determined that the network of the terminal device is not in the connected state, stopping wake-up of the terminal device by N application wake-up timers, where N is an integer greater than or equal to 1.

Furthermore, after stopping wake-up of the terminal device by N application wake-up timers, the operations further include determining again whether the network of the terminal device is in the connected state; and if it is determined that the network of the terminal device is in the connected state, resuming wake-up of the terminal device by the N application wake-up timers.

Furthermore, before resuming wake-up of the terminal device by the N application wake-up timers, the operations further include transferring N pieces of application wake-up timer information from a suspension list to a wake-up list; and resuming wake-up of the terminal device by the N application wake-up timers includes resuming wake-up of the terminal device by the application wake-up timers corresponding to the N pieces of application wake-up timer information in the wake-up list.

Furthermore, before stopping wake-up of the terminal device by N application wake-up timers, the operations further include transferring the N pieces of application wake-up timer information from the wake-up list to the suspension list, where the wake-up list includes M wake-up lists, and M is an integer greater than or equal to N; and stopping wake-up of the terminal device by N application wake-up timers includes stopping wake-up of the terminal device by the application wake-up timers corresponding to the N pieces of application wake-up timer information in the suspension list.

Furthermore, transferring the N pieces of application wake-up timer information from the wake-up list to the suspension list includes transferring, according to application identifier information in a preset blacklist, application wake-up timer information that is in the wake-up list and includes the application identifier information in the preset blacklist to the suspension list, where the application wake-up timer information includes identifier information of an application to which an application wake-up timer belongs; and/or determining whether a type of an application wake-up timer in application wake-up timer information in the wake-up list is a type of being capable of waking up a terminal device, where the application wake-up timer information includes that the type of an application wake-up timer is the type of being capable of waking up a terminal device or a type of being incapable of waking up a terminal device; and if it is determined that the type of an application wake-up timer in the wake-up list is the type of being capable of waking up a terminal device, transferring the wake-up timer information that is in the wake-up list and includes the type of being capable of waking up a terminal device to the suspension list.

Furthermore, if it is determined that the type of an application wake-up timer in the wake-up list is the type of being capable of waking up a terminal device, the method further includes determining whether the type of being capable of waking up a terminal device is a type of being useless to wake up a terminal device; and if it is determined that the type of being capable of waking up a terminal device is the type of being useless to wake up a terminal device, transfer application wake-up timer information that is in the wake-up list and includes the type of being useless to wake up a terminal device to the suspension list.

Still furthermore, if it is determined that the type of an application wake-up timer in the wake-up list is the type of being capable of waking up a terminal device, the method further includes determining whether the type of being capable of waking up a terminal device is a type of repeatedly waking up a terminal device; and if it is determined that the type of being capable of waking up a terminal device is the type of repeatedly waking up a terminal device, transferring, application wake-up timer information that is in the wake-up list and includes the type of repeatedly waking up a terminal device to the suspension list.

Optionally, determining whether the type of being capable of waking up a terminal device is a type of repeatedly waking up a terminal device includes determining whether the wake-up timer information includes a wake-up period, and if it is determined that the application wake-up timer information includes the wake-up period, determining that the type of being capable of waking up a terminal device is the type of repeatedly waking up a terminal device.

Optionally, before determining whether the type of being capable of waking up a terminal device is a type of repeatedly waking up a terminal device, the operations further include acquiring, within a preset time, wake-up intervals at which an application wake-up timer of the type of being capable of waking up a terminal device wakes up the terminal device K times, where K is an integer greater than or equal to 2; obtaining an average wake-up interval according to K−1 wake-up intervals; and obtaining a mean square error of the wake-up intervals according to the K−1 wake-up intervals and the average wake-up interval; and determining whether the type of being capable of waking up a terminal device is a type of repeatedly waking up a terminal device includes determining whether the mean square error is a value belonging to a preset range; and if it is determined that the mean square error is the value belonging to the preset range, determining that the type of being capable of waking up a terminal device is the type of repeatedly waking up a terminal device.

It should be noted that, for the technical solutions that are implemented by the processor 22 by invoking the program code stored in the memory 21, reference may be made to the foregoing embodiments of the wake-up control method of the present disclosure. The implementation principles and technical effects of the embodiments are similar, and reference may be made to related descriptions in the foregoing embodiments for details, which are not described herein again.

Figure 9:
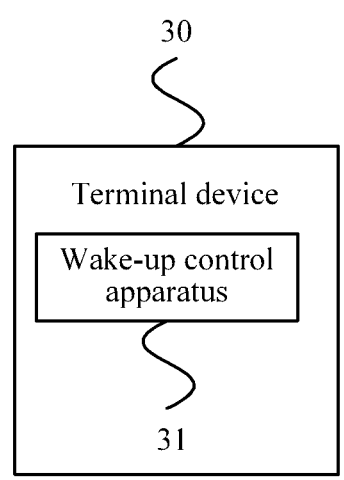
FIG. 9 is a schematic structural diagram of Embodiment 1 of a terminal according to the present disclosure.

FIG. 9 is a schematic structural diagram of Embodiment 1 of a terminal according to the present disclosure. As shown in FIG. 9, a terminal device 30 in this embodiment may include a wake-up control apparatus 31. The wake-up control apparatus 31 may use the structure in any embodiment of Embodiment 1 to Embodiment 3 of the wake-up control apparatus of the present disclosure, and the terminal device 30 may correspondingly perform the technical solution in any one embodiment of the foregoing embodiments of the wake-up control method of the present disclosure. Implementation principles and technical effects of the embodiments are similar, and reference may be made to related descriptions in the foregoing embodiments for details, which are not described herein again. The terminal device 30 may be a mobile phone or a tablet computer.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A wake-up control method, comprising:
determining, by a wake-up control apparatus, whether a network of a terminal device is in a connected state;
stopping, by the wake-up control apparatus, wake-up of the terminal device by N application wake-up timers when the network is not in the connected state, wherein N is an integer greater than or equal to 1;
subsequently determining, by the wake-up control apparatus, again whether the network is in the connected state;
transferring, by the wake-up control apparatus, N pieces of application wake-up timer information from a suspension list to a wake-up list; and
subsequently resuming, by the wake-up control apparatus, wake-up of the terminal device bar the N application wake-up timers corresponding to the N pieces of the application wake-up timer information in the wake-up list when the network is in the connected state.

2. The method according to claim 1, wherein before stopping wake-up of the terminal device by the N application wake-up timers, the method further comprises transferring, by the wake-up control apparatus, the N pieces of the application wake-up timer information from the wake-up list to the suspension list, wherein the wake-up list comprises M wake-up lists, wherein M is an integer greater than or equal to N, and wherein stopping wake-up of the terminal device by the N application wake-up timers comprises stopping, by the wake-up control apparatus, wake-up of the terminal device by the application wake-up timers corresponding to the N pieces of the application wake-up timer information in the suspension list.

3. The method according to claim 2, wherein transferring the N pieces of the application wake-up timer information from the wake-up list to the suspension list comprises transferring, by the wake-up control apparatus according to application identifier information in a preset blacklist, the application wake-up timer information that is in the wake-up list and that comprises the application identifier information in the preset blacklist to the suspension list, and wherein the application wake-up timer information comprises identifier information of an application to which an application wake-up timer belongs.

4. The method according to claim 3, wherein when the application wake-up timer is capable of waking up the terminal device, the method further comprises:
determining, by the wake-up control apparatus, whether the application wake-up timer that is capable of waking up the terminal device is useless to wake up a terminal device; and
transferring, by the wake-up control apparatus, the application wake-up timer information that is in the wake-up list and that indicates that the application wake-up timer is useless to wake up the terminal device to the suspension list when the application wake-up timer is useless to wake up the terminal device.

5. The method according to claim 3, wherein when the application wake-up timer is capable of waking up the terminal device, the method further comprises:
determining, by the wake-up control apparatus, whether the application wake-up timer that is capable of waking up the terminal device is a type that repeatedly wakes up the terminal device; and
transferring, by the wake-up control apparatus, the application wake-up timer information that is in the wake-up list and that indicates that the type that repeatedly wakes up the terminal device to the suspension list when the application wake-up timer that is capable of waking up the terminal device is the type that repeatedly wakes up the terminal device.

6. The method according to claim 5, wherein determining whether the application wake-up timer that is capable of waking up the terminal device is the type that repeatedly wakes up the terminal device comprises:
determining, by the wake-up control apparatus, whether the application wake-up timer information comprises a wake-up period; and
determining, by the wake-up control apparatus, that the application wake-up timer that is capable of waking up the terminal device is the type that repeatedly wakes up the terminal device when the application wake-up timer information comprises the wake-up period.

7. The method according to claim 5, wherein before determining whether the application wake-up timer that is capable of waking up the terminal device is the type that repeatedly wakes up the terminal device, the method further comprises:

acquiring, by the wake-up control apparatus within a preset time, wake-up intervals at which an application wake-up timer that is capable of waking up a terminal device wakes up the terminal device K times, wherein K is an integer greater than or equal to 2;

obtaining, by the wake-up control apparatus, an average wake-up interval according to K−1 wake-up intervals; and obtaining, by the wake-up control apparatus, a mean square error of the wake-up intervals according to the K−1 wake-up intervals and the average wake-up interval, and wherein determining whether the application wake-up timer that is capable of waking up the terminal device is the type that repeatedly wakes up the terminal device comprises:

determining, by the wake-up control apparatus, whether the mean square error is a value belonging to a preset range; and determining, by the wake-up control apparatus, that the application wake-up timer that is capable of waking up the terminal device is the type that repeatedly wakes up the terminal device when the mean square error is the value belonging to the preset range.

8. The method according to claim 2, wherein transferring the N pieces of the application wake-up timer information from the wake-up list to the suspension list comprises:

determining, by the wake-up control apparatus, whether a type of an application wake-up timer in the application wake-up timer information in the wake-up list is capable of waking up the terminal device, wherein the application wake-up timer information indicates whether the type of the application wake-up timer is capable of waking up the terminal device or is incapable of waking up the terminal device; and transferring, by the wake-up control apparatus, the application wake-up timer information that is in the wake-up list and is the type that is capable of waking up the terminal device to the suspension list when the type of the application wake-up timer is capable of waking up the terminal device.

9. A wake-up control apparatus, comprising:
a memory comprising instructions; and
a processor coupled to the memory, wherein the processor is configured to execute the instructions to:

determine whether a network of a terminal device is in a connected state;

stop wake-up of the terminal device by N application wake-up timers when the network is not in the connected state, wherein N is an integer greater than or equal to 1;

subsequently determine again whether the network is in the connected state;

transfer N pieces of application wake-up timer information from a suspension list to a wake-up list; and resume wake-up of the terminal device by the N application wake-up timers corresponding to the N pieces of the application wake-up timer information in the wake-up list when the network is in the connected state.

10. The apparatus according to claim 9, wherein the processor is further configured to transfer the N pieces of the application wake-up timer information from the wake-up list to the suspension list, wherein the wake-up list comprises M wake-up lists, wherein M is an integer greater than or equal to N, and wherein the processor is configured to stop wake-up of the terminal device by the application wake-up timers corresponding to the N pieces of the application wake-up timer information in the suspension list.

11. The apparatus according to claim 10, wherein the processor being configured to transfer the N pieces of the application wake-up timer information comprises the processor being configured to transfer, according to application identifier information in a preset blacklist, the application wake-up timer information that is in the wake-up list and that comprises the application identifier information in the preset blacklist to the suspension list, and wherein the application wake-up timer information comprises identifier information of an application to which an application wake-up timer belongs.

12. The apparatus according to claim 11, wherein when the application wake-up timer is capable of waking up the terminal device, the processor is further configured to:

determine whether the application wake-up timer that is capable of waking up a terminal device is useless to wake up the terminal device; and transfer the application wake-up timer information that is in the wake-up list and that indicates that the application wake-up timer is useless to wake up the terminal device to the suspension list when the application wake-up timer is useless to wake up the terminal device.

13. The apparatus according to claim 12, wherein when the application wake-up timer is capable of waking up the terminal device, the processor is further configured to:

determine whether the application wake-up timer that is capable of waking up the terminal device is a type that repeatedly wakes up the terminal device; and transfer the application wake-up timer information that is in the wake-up list and that indicates that the type that repeatedly wakes up the terminal device to the suspension list when the application wake-up timer that is capable of waking up the terminal device is the type that repeatedly wakes up the terminal device.

14. The apparatus according to claim 13, wherein the processor being configured to determine whether the application wake-up timer that is capable of waking up the terminal device is the type that repeatedly wakes up the terminal device comprises the processor being configured to:

determine whether the application wake-up timer information comprises a wake-up period; and determine that the application wake-up timer that is capable of waking up the terminal device is the type that repeatedly wakes up the terminal device when the application wake-up timer information comprises the wake-up period.

15. The apparatus according to claim 13, wherein the processor is further configured to:

acquire, within a preset time, wake-up intervals at which an application wake-up timer that is capable of waking up a terminal device wakes up the terminal device K times, wherein K is an integer greater than or equal to 2;

obtain an average wake-up interval according to K−1 wake-up intervals; and obtain a mean square error of the wake-up intervals according to the K−1 wake-up intervals and the average wake-up interval, and wherein the processor being configured to determine whether the application wake-up timer that is capable of waking up the terminal device is the type that repeatedly wakes up the terminal device comprises the processor being configured to:
determine whether the mean square error is a value belonging to a preset range; and
determine that the application wake-up timer that is capable of waking up the terminal device is the type that repeatedly wakes up the terminal device when the mean square error is the value belonging to the preset range.

16. The apparatus according to claim 10, wherein the processor being configured to transfer the N pieces of the application wake-up timer information from the wake-up list to the suspension list comprises the processor being configured to:
determine whether a type of an application wake-up timer in the application wake-up timer information in the wake-up list is capable of waking up the terminal device, wherein the application wake-up timer information indicates whether the type of the application wake-up timer is capable of waking up the terminal device or is incapable of waking up the terminal device; and
transfer the application wake-up timer information that is in the wake-up list and is the type that is capable of waking up the terminal device to the suspension list when the type of the application wake-up timer is capable of waking up the terminal device.

* * * * *

UNITED STATES PATENT AND TRADEMARK OFFICE
CERTIFICATE OF CORRECTION

PATENT NO. : 9,867,131 B2
APPLICATION NO. : 14/921551
DATED : January 9, 2018
INVENTOR(S) : Konggang Wei et al.

It is certified that error appears in the above-identified patent and that said Letters Patent is hereby corrected as shown below:

In the Claims

Column 23, Lines 50-67, Claim 1 should read:
1. A wake-up control method, comprising:
    determining, by a wake-up control apparatus, whether a network of a terminal device is in a connected state;
    stopping, by the wake-up control apparatus, wake-up of the terminal device by N application wake-up timers when the network is not in the connected state, wherein N is an integer greater than or equal to 1;
    subsequently determining, by the wake-up control apparatus, again whether the network is in the connected state;
    transferring, by the wake-up control apparatus, N pieces of application wake-up timer information from a suspension list to a wake-up list; and
    subsequently resuming, by the wake-up control apparatus, wake-up of the terminal device by the N application wake-up timers corresponding to the N pieces of the application wake-up timer information in the wake-up list when the network is in the connected state.

Signed and Sealed this
Tenth Day of April, 2018

Andrei Iancu
*Director of the United States Patent and Trademark Office*